(12) United States Patent
Yang (10) Patent No.: US 10,708,330 B2
(45) Date of Patent: Jul. 7, 2020

(54) MULTIMEDIA RESOURCE MANAGEMENT METHOD, CLOUD SERVER AND ELECTRONIC APPARATUS

(71) Applicant: HUIZHOU TCL MOBILE COMMUNICATION CO., LTD., Huizhou, Guangdong (CN)

(72) Inventor: Rui Yang, Huizhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 1357 days.

(21) Appl. No.: 14/769,263

(22) PCT Filed: Aug. 27, 2014

(86) PCT No.: PCT/CN2014/085281
§ 371 (c)(1),
(2) Date: Aug. 20, 2015

(87) PCT Pub. No.: WO2015/192472
PCT Pub. Date: Dec. 23, 2015

(65) Prior Publication Data
US 2016/0248832 A1    Aug. 25, 2016

(30) Foreign Application Priority Data
Jun. 18, 2014 (CN) .......................... 2014 1 0274522

(51) Int. Cl.
*G06F 15/16* (2006.01)
*H04L 29/06* (2006.01)
*H04L 29/08* (2006.01)

(52) U.S. Cl.
CPC ........ *H04L 65/601* (2013.01); *H04L 65/4084* (2013.01); *H04L 67/06* (2013.01);
(Continued)

(58) Field of Classification Search
CPC ... H04L 65/4084; H04L 65/601; H04L 67/06; H04L 67/10; H04L 67/26; H04L 67/34
(Continued)

(56) References Cited

U.S. PATENT DOCUMENTS 9,615,195 B2   4/2017 Yang
2010/0251299 A1   9/2010 Scott et al.
(Continued)

FOREIGN PATENT DOCUMENTS

CN   101620603 A   1/2010
CN   101741816 A   6/2010
(Continued)

*Primary Examiner* — Normin Abedin (57) ABSTRACT

A multimedia resource management method, a cloud server and an electronic apparatus are disclosed. The multimedia resource management method includes: receiving by a cloud server multimedia resource demand configuration information transmitted by a first or second electronic apparatus; performing a matching operation by the cloud server according to the multimedia resource demand configuration information to generate multimedia resource push information; transmitting the multimedia resource push information by the cloud server to the first or second electronic apparatus so that the first or second electronic apparatus selects the corresponding one of the first and second electronic apparatus to download the multimedia resource corresponding to the multimedia resource push information so as to generate a selection result; and transmitting by the cloud server the multimedia resource corresponding to the multimedia resource push information to the first electronic apparatus or the second electronic apparatus according to the selection result.

20 Claims, 3 Drawing Sheets

(52) U.S. Cl.
CPC .............. *H04L 67/10* (2013.01); *H04L 67/26* (2013.01); *H04L 67/34* (2013.01)

(58) Field of Classification Search
USPC ........................................................ 709/219
See application file for complete search history.

(56) References Cited

U.S. PATENT DOCUMENTS

| | | |
|---|---|---|
| 2011/0143732 A1 | 6/2011 | Yang et al. |
| 2012/0287022 A1* | 11/2012 | Queen .................. H04L 12/2814 345/2.1 |
| 2013/0046873 A1* | 2/2013 | O .......................... H04L 65/403 709/223 |
| 2013/0054753 A1 | 2/2013 | Long et al. |
| 2013/0227621 A1 | 8/2013 | Barton |
| 2014/0340330 A1* | 11/2014 | Trachtenberg ........ G06F 1/1626 345/173 |
| 2015/0019559 A1* | 1/2015 | Maquaire .............. G06F 16/907 707/740 |

FOREIGN PATENT DOCUMENTS

| | | |
|---|---|---|
| CN | 102143385 A | 8/2011 |
| CN | 102594883 A | 7/2012 |
| CN | 102595344 A | 7/2012 |
| CN | 103297541 A | 9/2013 |
| CN | 103327053 A | 9/2013 |
| CN | 103634700 A | 3/2014 |
| CN | 103701875 A | 4/2014 |
| EP | 1471452 A1 | 10/2004 |
| WO | 2007023494 A2 | 3/2007 |

* cited by examiner

MULTIMEDIA RESOURCE MANAGEMENT METHOD, CLOUD SERVER AND ELECTRONIC APPARATUS

RELATED APPLICATION

This application is a national phase entry under 35 USC 371 of International Patent Application No PCT/CN2014/085281 filed on Aug. 27, 2014, which claims priority from Chinese Patent Application No. 20140274522.0 filed on Jun. 18, 2014, the disclosures of which are incorporated in their entirety by reference herein.

FIELD OF THE INVENTION

The present disclosure generally relates to the technical field of multimedia, and more particularly, to a multimedia resource management method, a cloud server and an electronic apparatus.

BACKGROUND OF THE INVENTION

With the continuous improvement of the living standard and advancement of science and technologies, there are more and more demands to share multimedia resources such as pictures, audios and videos within a local area network (LAN) such as a home LAN, an example of which is to share multimedia resources among different apparatuses within a home LAN according to the Digital Living Network Alliance (DLNA) protocol. Furthermore, each user has his or her preferred multimedia resource types. For example, a user A prefers to watch funny videos while a user B prefers to watch sentimental videos.

The present inventor has found through long-term research and development that, the conventional multimedia resource sharing method cannot well satisfy the users' increased demands for multimedia resources because the storage space of apparatuses for storing the multimedia resources are limited; and besides, the users need to search by themselves for necessary or favorite multimedia resources using the conventional method, so the user experiences are relatively poor.

SUMMARY OF THE INVENTION

A primary technical problem to be solved by the present disclosure is to provide a multimedia resource management method, a cloud server and an electronic apparatus, which can well satisfy the users' demands for multimedia resources and improve user experiences.

To solve the aforesaid technical problem, a first aspect of the present disclosure is to provide a multimedia resource management method, which comprises: receiving by a cloud server multimedia resource demand configuration information transmitted by a first electronic apparatus or a second electronic apparatus, wherein the multimedia resource demand configuration information is generated by the first electronic apparatus or the second electronic apparatus through recording a multimedia resource that a user plays; performing a matching operation by the cloud server according to the multimedia resource demand configuration information to generate multimedia resource push information; transmitting the multimedia resource push information by the cloud server to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result, wherein the first electronic apparatus and the second electronic apparatus are electronic apparatuses that support multimedia resource sharing within a local area network (LAN); and transmitting by the cloud server the multimedia resource corresponding to the multimedia resource push information to the first electronic apparatus or the second electronic apparatus according to the selection result.

Typically, the step of performing a matching operation by the cloud server according to the multimedia resource demand configuration information to generate multimedia resource push information specifically comprises: determining by the cloud server whether an updated multimedia resource corresponding to the multimedia resource demand configuration information exists in a multimedia resource database of the cloud server, and if the updated multimedia resource exists in the multimedia resource database, then generating multimedia resource push information corresponding to the updated multimedia resource.

Typically, the first electronic apparatus and the second electronic apparatus are specifically electronic apparatuses that support the Digital Living Network Alliance (DLNA) protocol within the LAN to achieve multimedia resource sharing.

To solve the aforesaid technical problem, a second aspect of the present disclosure is to provide a cloud server, which comprises: an information receiving module, being configured to receive multimedia resource demand configuration information transmitted by a first electronic apparatus or a second electronic apparatus, wherein the multimedia resource demand configuration information is generated by the first electronic apparatus or the second electronic apparatus through recording a multimedia resource that a user plays; a matching operation module, being configured to perform a matching operation according to the multimedia resource demand configuration information to generate multimedia resource push information; an information transmitting module, being configured to transmit the multimedia resource push information to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result, wherein the first electronic apparatus and the second electronic apparatus are electronic apparatuses that support multimedia resource sharing within an LAN; and a resource transmitting module, being configured to transmit the multimedia resource corresponding to the multimedia resource push information to the first electronic apparatus or the second electronic apparatus according to the selection result.

Typically, the matching operation module is specifically configured to determine whether an updated multimedia resource corresponding to the multimedia resource demand configuration information exists in a multimedia resource database of the cloud server, and if the updated multimedia resource exists in the multimedia resource database, then generate multimedia resource push information corresponding to the updated multimedia resource.

To solve the aforesaid technical problem, a third aspect of the present disclosure is to provide an electronic apparatus, which comprises: a recording module, being configured to generate multimedia resource demand configuration information through recording a multimedia resource that a user plays; an information transmitting module, being configured to transmit the multimedia resource demand configuration information to a cloud server so that the cloud server performs a matching operation according to the multimedia resource demand configuration information to generate multimedia resource push information; an information receiving module, being configured to receive the multimedia resource push information transmitted by the cloud server; a selecting module, being configured to, after the multimedia resource push information transmitted by the cloud server has been received by the information receiving module, select the electronic apparatus or another electronic apparatus to download the multimedia resource corresponding to the multimedia resource push information so as to generate a selection result, wherein the electronic apparatus and the another electronic apparatus are electronic apparatuses that support multimedia resource sharing within an LAN; and a resource receiving module, being configured to receive the multimedia resource corresponding to the multimedia resource push information transmitted by the cloud server when the selection result indicates that the multimedia resource corresponding to the multimedia resource push information is to be downloaded by the electronic apparatus.

Typically, the electronic apparatus further comprises a resource sharing module, which is configured to, after the multimedia resource corresponding to the multimedia resource push information transmitted by the cloud server has been received by the resource receiving module, share the multimedia resource with any of other electronic apparatuses that supports multimedia resource sharing within the LAN so that any of the other electronic apparatuses would be able to play the multimedia resource.

Typically, the electronic apparatus and the another electronic apparatus are specifically electronic apparatuses that support the DLNA protocol within the LAN to implement multimedia resource sharing.

As compared to the prior art, the present disclosure has the following benefits: the cloud server of the present disclosure receives multimedia resource demand configuration information transmitted by a first electronic apparatus or a second electronic apparatus, performs a matching operation according to the multimedia resource demand configuration information to generate multimedia resource push information, further transmits the multimedia resource push information to the first electronic apparatus or the second electronic apparatus so that the first electronic apparatus or the second electronic apparatus correspondingly generates a selection result, and finally transmits the multimedia resource corresponding to the multimedia resource push information to the first electronic apparatus or the second electronic apparatus according to the selection result. In the aforesaid way, the present disclosure can well satisfy the users' demands for multimedia resources and can improve user experiences.

DETAILED DESCRIPTION OF THE INVENTION

For purpose of illustration rather than limitation, specific details such as particular system structures, interfaces and technologies are proposed in the following description to enable thorough understanding of the present application. However, it shall be apparent to those skilled in the art that, the present application can be implemented in other embodiments without these specific details. In other cases, detailed descriptions of well-known devices, circuits and methods are omitted to prevent obscuring of the present application by unnecessary details.

Figure 1:
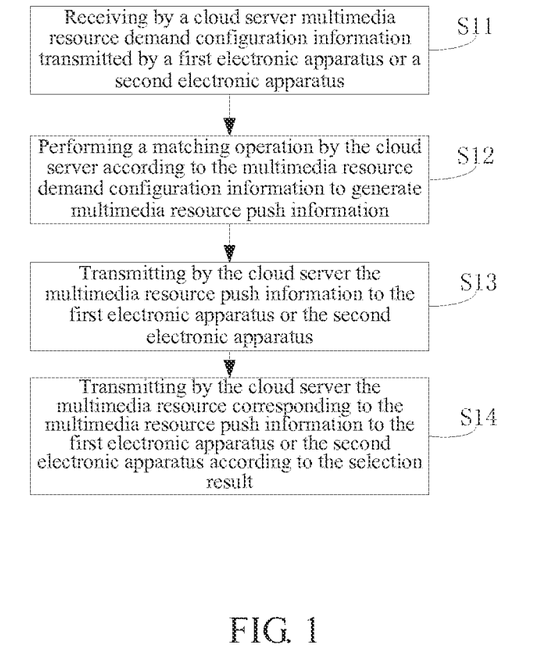
FIG. 1 is a flowchart diagram of a first embodiment of a multimedia resource management method according to the present disclosure.

Referring to FIG. 1, a first embodiment of a multimedia resource management method according to the present disclosure comprises the following steps.

Step S11: receiving by a cloud server multimedia resource demand configuration information transmitted by a first electronic apparatus or a second electronic apparatus.

The cloud server receives the multimedia resource demand configuration information transmitted by the first electronic apparatus or the second electronic apparatus. The multimedia resource demand configuration information is generated by the first electronic apparatus or the second electronic apparatus through recording a multimedia resource that a user plays. The multimedia resource demand configuration information comprises format information of the multimedia resource and category information of the multimedia resource. The "format" in the "format information of the multimedia resource" refers to formats of the multimedia resource, e.g., a picture format, a video format, an audio format, etc. For pictures, the "category" in the "category information of the multimedia resource" refers to different types of pictures, e.g., funny pictures, emotive pictures, scenery pictures, etc; for videos, the "category" in the "category information" refers to different types of videos, e.g., online humors, news, sports competitions, entertainment tidbits, domestic TV plays, overseas TV plays, domestic movies, orient movies, western movies, parent-child movies, etc; and for audios, the "category" in the "category information" refers to different types of audios, e.g., funny audios, movie and TV play audios, chorus audios, etc. Each user corresponds to different multimedia resource demand configuration information, and the multimedia resource corresponding to the multimedia resource demand configuration information is the user's needed or favorite multimedia resource. As compared to the first electronic apparatus and the second electronic apparatus, a multimedia resource database of the cloud server has a far more larger storage space, and the multimedia resource database is stored with plenty of multimedia resources that are updated in real time.

The multimedia resource demand configuration information may be generated by the first electronic apparatus through recording a multimedia resource that a user plays via the first electronic apparatus, and further transmitted by the first electronic apparatus to the cloud server. The multimedia resource demand configuration information may also be generated by the second electronic apparatus through recording a multimedia resource that a user plays via the second electronic apparatus, and transmitted to the cloud server by the second electronic apparatus, or first transmitted to the first electronic apparatus by the second electronic apparatus, and then transmitted to the cloud server by the first electronic apparatus.

The first electronic apparatus and the second electronic apparatus are electronic apparatuses that support multimedia resource sharing within a local area network (LAN). Further speaking, the first electronic apparatus and the second electronic apparatus are specifically electronic apparatuses that support Digital Living Network Alliance (DLNA) protocol within the LAN to share multimedia resources. The DLAN is established by corporations including Sony Corporation, Intel Corporation, Microsoft Corporation and the like, and comprises five layers of components, namely, network interconnection, network protocol, media transport, device discovery & control and management, and media. The normalized definition of the five layers of components allows for interconnection and communication of wireless networks and wired networks accommodating personal computers (PCs), consumer appliances, mobile terminals, etc, and makes possible unlimited sharing and growth of digital media and content services. Additionally, in other embodiments, the first electronic apparatus and the second electronic apparatus may also be electronic apparatuses that support other network protocols within the LAN to achieve multimedia resource sharing. The aforesaid LAN is specifically a home LAN which can implement network transmission via WIFI or the like. The first electronic apparatus may be specifically a set top box, and the second electronic apparatus may be specifically a mobile terminal, e.g., a mobile phone.

Step S12: performing a matching operation by the cloud server according to the multimedia resource demand configuration information to generate multimedia resource push information.

The cloud server performs a matching operation according to the received multimedia resource demand configuration information to generate the multimedia resource push information. The step S12 specifically comprises: determining by the cloud server whether an updated multimedia resource corresponding to the multimedia resource demand configuration information exists in a multimedia resource database of the cloud server, and if the updated multimedia resource exists in the multimedia resource database, then generating multimedia resource push information corresponding to the updated multimedia resource. The multimedia resource push information specifically comprises identification information of the multimedia resource and download link information of the multimedia resource, and the identification information may be specifically the name of the multimedia resource.

For example, if the multimedia resource demand configuration information comprises the format information of videos and the category information of parent-child movies, then it indicates that the user is in need for parent-child videos. In this case, the cloud server performs in the multimedia resource database thereof a matching operation to determine whether an updated parent-child video exists in the multimedia resource database, and if the updated parent-child video exists in the multimedia resource database, then corresponding multimedia resource push information is generated. The multimedia resource push information specifically comprises the identification information and the download link information of the updated parent-child video.

Step S13: transmitting by the cloud server the multimedia resource push information to the first electronic apparatus or the second electronic apparatus.

The cloud server further transmits the generated multimedia resource push information to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result.

Specifically, the could server transmits the multimedia resource push information correspondingly to the first electronic apparatus or the second electronic apparatus according to the identification information of the first electronic apparatus or the identification information of the second electronic apparatus stored in the cloud server.

For example, if the first electronic apparatus is a set top box, the cloud server correspondingly transmits the multimedia resource push information to the set top box via WiFi or a wired network according to the identification information of the set top box;

and if the second electronic apparatus is a mobile terminal such as a mobile phone, the identification information of the second electronic apparatus may be specifically the serial number or the communication number of the mobile phone. Before transmitting the multimedia resource push information to the second electronic apparatus, the cloud server firstly obtains the status of a Packet Switch (PS) domain of the second electronic apparatus to check whether the data service of the second electronic apparatus is activated. If the data service of the second electronic apparatus is activated, then the cloud server further transmits the multimedia resource push information to the second electronic apparatus corresponding to the serial number via the PS domain. If the data service of the second electronic apparatus is deactivated, then the cloud server transmits the multimedia resource push information in the form of a text message to the second electronic apparatus corresponding to the communication number via a Circuit Switch (CS) domain.

When the cloud server transmits the multimedia resource push information to the set top box serving as the first electronic apparatus, the user controls the first electronic apparatus to generate a corresponding selection result according to practical situations, e.g., according to the storage space capacities of the first and the second electronic apparatuses or according to whether the second electronic apparatus is in a network environment having a relatively fast transmission speed (e.g., WiFi, 3G or 4G network environments). For instance, if the space capacity of the second electronic apparatus for storing the multimedia resource is relatively small, then the user controls the first electronic apparatus to select the first electronic apparatus to download the multimedia resource so as to generate the corresponding selection result; and if the space capacity of the first electronic apparatus for storing the multimedia resource is relatively small, then the user controls the first electronic apparatus to select the second electronic apparatus to download the multimedia resource so as to generate the corresponding selection result. Also for example, if the second electronic apparatus is currently in the WiFi network environment, then the first electronic apparatus selects the second electronic apparatus to download the multimedia resource so as to generate the corresponding selection result. For example, if the second electronic apparatus is currently in the 2G network environment, then the first electronic apparatus selects the first electronic apparatus to download the multimedia resource so as to generate the corresponding selection result.

When the cloud server transmits the multimedia resource push information to the mobile phone serving as the second electronic apparatus, the user controls the second electronic apparatus to generate a corresponding selection result according to practical situations, e.g., according to the storage space capacities of the electronic apparatuses or according to whether the second electronic apparatus is in a network environment having a relatively fast transmission speed (e.g., WiFi, 3G or 4G network environments). For example, if the space capacity of the second electronic apparatus for storing the multimedia resource is relatively small, then the user controls the second electronic apparatus to select the first electronic apparatus to download the multimedia resource so as to generate the corresponding selection result; and if the space capacity of the first electronic apparatus for storing the multimedia resource is relatively small, then the user controls the second electronic apparatus to select the second electronic apparatus to download the multimedia resource so as to generate the corresponding selection result. Since the second electronic apparatus is a mobile terminal that is generally carried along by the user, it is made possible for the user to remotely control the multimedia resource to be downloaded to the first electronic apparatus within the LAN or onto the second electronic apparatus carried by the user by transmitting the multimedia resource push information to the second electronic apparatus when the user carrying the second electronic apparatus is at other positions outside the LAN, e.g., when the user is not at home.

Step S14: transmitting by the cloud server the multimedia resource corresponding to the multimedia resource push information to the first electronic apparatus or the second electronic apparatus according to the selection result.

The cloud server further transmits the multimedia resource corresponding to the multimedia resource push information to the first electronic apparatus or the second electronic apparatus according to the selection result of the first electronic apparatus or the second electronic apparatus. Moreover, the user may also set other information such as a connection password so that only if the connection password received by the cloud server is verified to be the right connection password transmits the cloud server the multimedia resource to the first electronic apparatus or the second electronic apparatus before the multimedia resource is transmitted.

In other embodiments, after receiving the multimedia resource transmitted by the cloud server, the first electronic apparatus or the second electronic apparatus correspondingly shares the multimedia resource with any of other electronic apparatuses that supports multimedia resource sharing within the LAN so that any of the other electronic apparatuses would be able to play the multimedia resource.

In this embodiment, the first electronic apparatus, the second electronic apparatus and the other electronic apparatuses within the LAN are electronic apparatuses that support the DLNA protocol. When the multimedia resource transmitted by the cloud server is received by the set top box serving as the first electronic apparatus, the set top box further shares the multimedia resource with any of the other electronic apparatuses (e.g., the second electronic apparatus) within the same LAN so that any of the other electronic apparatuses correspondingly plays the multimedia resource. In this case, the set top box serves as a server for multimedia resource sharing within the LAN. Any of the other electronic apparatuses is specifically an electronic apparatus that supports the DLAN protocol, e.g., a television, a projection apparatus, a loudspeaker, etc. For example, after the multimedia resource is downloaded into the set top box, a mobile phone is used as a remote control apparatus to firstly search for the multimedia resource within the set top box and then control other electronic apparatuses that can play the multimedia resource (e.g., a television) to correspondingly play the multimedia resource. When the multimedia resource transmitted by the cloud server is received by the mobile phone serving as the second electronic apparatus, the mobile phone shares the multimedia resource to any of the other electronic apparatuses (e.g., a television or a projection apparatus) in order to play the multimedia resource. In this case, the mobile phone serves as a server for multimedia resource sharing within the LAN. Additionally, in other embodiments, the multimedia resource may also be played directly on the mobile phone.

It shall be appreciated that, in the first embodiment of the multimedia resource management method according to the present disclosure, the cloud server receives multimedia resource demand configuration information transmitted by a first electronic apparatus or a second electronic apparatus, performs a matching operation according to the multimedia resource demand configuration information to generate multimedia resource push information, further transmits the multimedia resource push information to the first electronic apparatus or the second electronic apparatus so that the first electronic apparatus or the second electronic apparatus correspondingly generates a selection result, and finally transmits the multimedia resource corresponding to the multimedia resource push information to the first electronic apparatus or the second electronic apparatus according to the selection result. Thus, plenty of multimedia resources stored in the cloud server are able to be shared within the LAN, so that the users' demands for multimedia resources can be well satisfied. Besides, the cloud server performs the matching operation according to the multimedia resource demand configuration information to generate multimedia resource push information, thus the needed multimedia resources are pushed intelligently that the users do not need to search for the multimedia resources by themselves, and this improves the user experiences. Moreover, when the users are at other positions outside the LAN, they can remotely control the multimedia resource to be downloaded to the first electronic apparatus or the second electronic apparatus.

Figure 2:
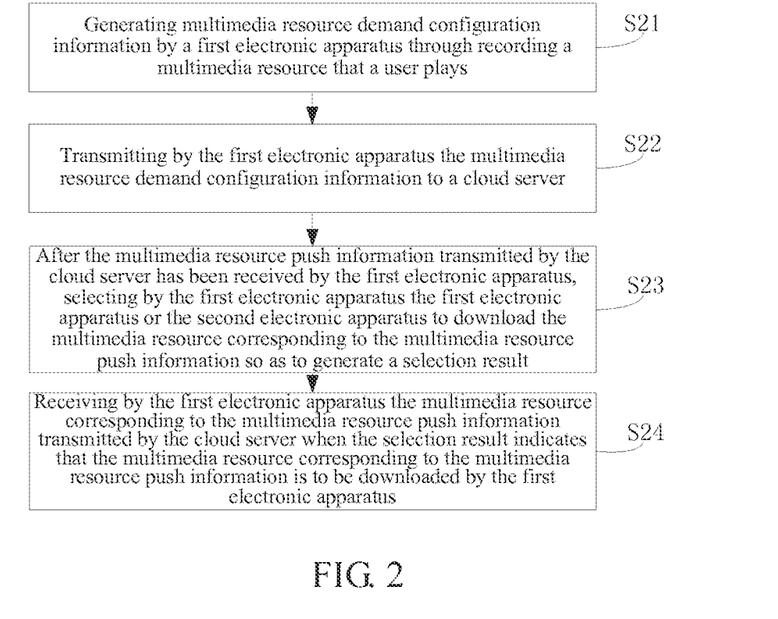
FIG. 2 is a flowchart diagram of a second embodiment of the multimedia resource management method according to the present disclosure.

Referring to FIG. 2, a second embodiment of the multimedia resource management method according to the present disclosure comprises the following steps.

Step S21: generating multimedia resource demand configuration information by a first electronic apparatus through recording a multimedia resource that a user plays.

The first electronic apparatus generates the multimedia resource demand configuration information through recording a multimedia resource that a user plays. Specifically, the first electronic apparatus generates the multimedia resource demand configuration information through recording various multimedia resources that a user plays within a certain time period.

Step S22: transmitting by the first electronic apparatus the multimedia resource demand configuration information to a cloud server.

The first, electronic apparatus further transmits the generated multimedia resource demand configuration information to the cloud server so that the cloud server performs a matching operation according to the multimedia resource demand configuration information to generate multimedia resource push information. The multimedia resource push information specifically comprises the identification information of the multimedia resource and the download link information of the multimedia source.

The cloud server further transmits the multimedia resource push information to the first electronic apparatus or the second electronic apparatus.

Step S23: after the multimedia resource push information transmitted by the cloud server has been received by the first electronic apparatus, selecting by the first electronic apparatus the first electronic apparatus or the second electronic apparatus to download the multimedia resource corresponding to the multimedia resource push information so as to generate a selection result.

After the multimedia resource push information transmitted by the cloud server has been received by the first electronic apparatus, the first electronic apparatus selects the first electronic apparatus or the second electronic apparatus to download the multimedia resource corresponding to the multimedia resource push information so as to generate a selection result; and the first electronic apparatus further transmits the selection result to the cloud server. The first electronic apparatus and the second electronic apparatus are electronic apparatuses that support multimedia resource sharing within an LAN. In this embodiment, the first electronic apparatus is a set top box, and the second electronic apparatus is a mobile terminal such as a mobile phone. In other embodiments, the first electronic apparatus is a mobile terminal, and the second electronic apparatus is a set top box. The data interaction between the set top box and the cloud server may be specifically implemented via WiFi or a wired network, while the data interaction between the mobile phone and the cloud server may be specifically implemented via 2G, 3G, 4G networks or WiFi.

In other embodiments, when the multimedia resource push information is received by the second electronic apparatus, the selection result is correspondingly generated by the second electronic apparatus.

Step S24: receiving by the first electronic apparatus the multimedia resource corresponding to the multimedia resource push information transmitted by the cloud server when the selection result indicates that the multimedia resource corresponding to the multimedia resource push information is to be downloaded by the first electronic apparatus.

When the selection result indicates that the multimedia resource corresponding to the multimedia resource push information is to be downloaded by the first electronic apparatus, the first electronic apparatus establishes a download connection with the cloud server via the download link information in the multimedia resource push information, and further receives the multimedia resource corresponding to the multimedia resource push information transmitted by the cloud server. In other embodiments, if the selection result indicates that the multimedia resource is to be downloaded by the second electronic apparatus, then the multimedia resource transmitted by the cloud server is correspondingly received by the second electronic apparatus.

Additionally, in other embodiments, the multimedia resource management method further comprises the following step after the aforesaid step S24 of receiving by the first electronic apparatus the multimedia resource corresponding to the multimedia resource push information transmitted by the cloud server: sharing by the first electronic apparatus the multimedia resource with any of other electronic apparatuses that supports multimedia resource sharing within the LAN so that any of the other electronic apparatuses would be able to play the multimedia resource.

Moreover, in other embodiments, the user can also transmit and store the multimedia resources stored in the first electronic apparatus and the second electronic apparatus to the cloud server via the first electronic apparatus and/or the second electronic apparatus, or manage (e.g., delete) the multimedia resource stored in the cloud server. That is, the cloud server is provided with private storage spaces for the multimedia resources of each user. For example, the multimedia resources stored in the mobile phone are uploaded by the mobile phone into the cloud server, or the multimedia resources stored in the mobile phone are firstly transmitted by the mobile phone to the set top box, and then uploaded from the set top box into the cloud server.

It shall be appreciated that, in the second embodiment of the multimedia resource management method according to the present disclosure, the first electronic apparatus generates multimedia resource demand configuration information through recording a multimedia resource that a user plays; further transmits the multimedia resource demand configuration information to a cloud server so that the cloud server performs a matching operation according to the multimedia resource demand configuration information to generate multimedia resource push information; correspondingly generates a selection result after the multimedia resource push information transmitted by the cloud server has been received by the first electronic apparatus; and receives the multimedia resource corresponding to the multimedia resource push information transmitted by the cloud server when the selection result indicates that the multimedia resource corresponding to the multimedia resource push information is to be downloaded by the first electronic apparatus. Thus, the present disclosure can well satisfy the users' demands for multimedia resources and improve user experiences.

Figure 3:
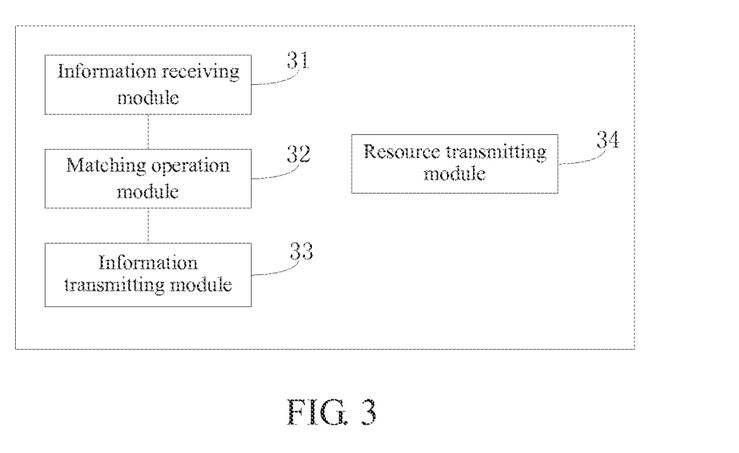
FIG. 3 is a structural block diagram of an embodiment of a cloud server according to the present disclosure.

Referring to FIG. 3, a cloud server according to an embodiment of the present disclosure comprises:

an information receiving module 31, being configured to receive multimedia resource demand configuration information transmitted by a first electronic apparatus or a second electronic apparatus, wherein the multimedia resource demand configuration information is generated by the first electronic apparatus or the second electronic apparatus through recording a multimedia resource that a user plays;

a matching operation module 32, being configured to perform a matching operation according to the multimedia resource demand configuration information received by the information receiving module 31 to generate multimedia resource push information. The matching operation module 32 is specifically configured to determine whether an updated multimedia resource corresponding to the multimedia resource demand configuration information exists in a multimedia resource database of the cloud server, and if the updated multimedia resource exists in the multimedia resource database, then generate multimedia resource push information corresponding to the updated multimedia resource;

an information transmitting module 33, being configured to transmit the multimedia resource push information generated by the matching operation module 32 to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result, wherein the first electronic apparatus and the second electronic apparatus are electronic apparatuses that support multimedia resource sharing within an LAN; and a resource transmitting module 34, being configured to transmit the multimedia resource corresponding to the multimedia resource push information to the first electronic apparatus or the second electronic apparatus according to the selection result.

Figure 4:
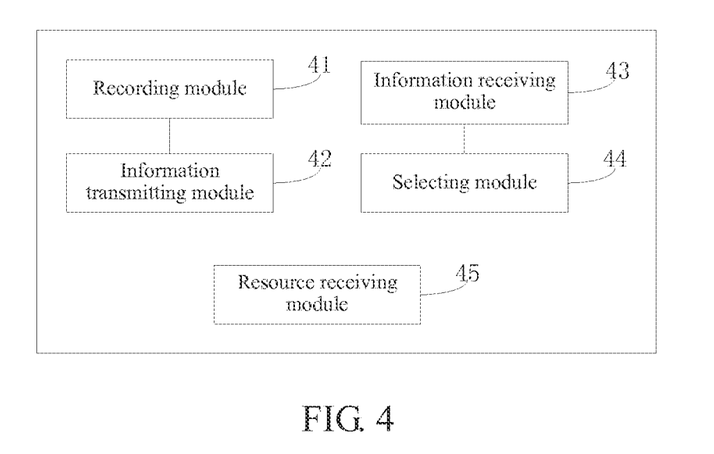
FIG. 4 is a structural block diagram of an embodiment of an electronic apparatus according to the present disclosure.

Referring to FIG. 4, an embodiment of an electronic apparatus according to the present disclosure comprises:

a recording module 41, being configured to generate multimedia resource demand configuration information through recording a multimedia resource that a user plays;

an information transmitting module 42, being configured to transmit the multimedia resource demand configuration information recorded by the recording module 41 to a cloud server so that the cloud server performs a matching operation according to the multimedia resource demand configuration information to generate multimedia resource push information;

an information receiving module 43, being configured to receive the multimedia resource push information transmitted by the cloud server;

a selecting module 44, being configured to, after the multimedia resource push information transmitted by the cloud server has been received by the information receiving module 43, select the electronic apparatus or another electronic apparatus to download the multimedia resource corresponding to the multimedia resource push information so as to generate a selection result, wherein the electronic apparatus and the another electronic apparatus are electronic apparatuses that support multimedia resource sharing within an LAN; and a resource receiving module 45, being configured to receive the multimedia resource corresponding to the multimedia resource push information transmitted by the cloud server when the selection result indicates that the multimedia resource corresponding to the multimedia resource push information is to be downloaded by the electronic apparatus.

It should be understood that, in the several embodiments of the present application, the system, the apparatus, and the method that are disclosed may be implemented in other manners. For example, the apparatus embodiment described above is only illustrative. As an example, the division of the modules or units only represents the division of logical functions, and there may be other division manners in practical implementations; for example, a plurality of units or components may be combined into or integrated into another system, or some features may be omitted or may not be implemented. Additionally, the coupling or direct coupling or communication connections that are shown or discussed may be indirect coupling or communication connections implemented via some interfaces, devices or units, and may be in an electrical form, a mechanical form or in other forms.

The units described as separate components may be or may not be physically separate, and the components shown as units may be or may not be physical units, and may be co-located at a same place or distributed among a plurality of network units. A part of or all of the units may be selected depending on the actual need to achieve the objective of the present embodiment.

Furthermore, in the embodiments of the present application, the various function units may be integrated into one processing unit, or each unit may be implemented as a separate physical unit, or two or more units may be integrated into a single unit. The integrated unit may be implemented either in the form of hardware or in the form of software functional units.

If the integrated unit is to be implemented in the form of software functional units and to be marketed or used as a standalone product, then it can be stored in a computer-readable storage medium. Based on this, the technical solutions of the present application in nature or the part of the technical solutions that can con tribute to the prior art or all or part of the technical solutions can be embodied as a software product. The computer software product is stored in a storage medium, and comprises a plurality of instructions which enable a computer apparatus (e.g., a personal computer, a server, a network apparatus or etc.) or a processor to execute all or some of the steps of the method described in the various embodiments of the present application. The aforesaid storage medium includes various media that can store program codes such as a USB flash disk, a mobile hard disk, a read-only memory (ROM), a random access memory (RAM), a magnetic disk or an optical disk.

What is claimed is:

1. A multimedia resource management method, comprising:

receiving by a cloud server multimedia resource demand configuration information transmitted by a first electronic apparatus or a second electronic apparatus; wherein the multimedia resource demand configuration information is generated by the first electronic apparatus or the second electronic apparatus through recording a multimedia resource that a user plays;

performing a matching operation by the cloud server according to the multimedia resource demand configuration information to generate multimedia resource push information;

transmitting the multimedia resource push information by the cloud server to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result; and transmitting by the cloud server the multimedia resource corresponding to the multimedia resource push information to the first electronic apparatus or the second electronic apparatus according to the selection result so that the first electronic apparatus or the second electronic apparatus downloads the multimedia resource.

2. The method of claim 1, wherein the step of performing the matching operation by the cloud server according to the multimedia resource demand configuration information to generate the multimedia resource push information specifically comprises:

determining by the cloud server whether an updated multimedia resource corresponding to the multimedia resource demand configuration information exists in a multimedia resource database of the cloud server, and if the updated multimedia resource exists in the multimedia resource database, then generating the multimedia resource push information, corresponding to the updated multimedia resource.

3. The method of claim 1, wherein:

the first electronic apparatus and the second electronic apparatus are configured to support the Digital Living Network Alliance (DLNA) protocol within the LAN to achieve multimedia resource sharing.

4. The method of claim 1, wherein the first electronic apparatus and the second electronic apparatus are electronic apparatuses that support multimedia resource sharing within a local area network (LAN).

5. The method of claim 4, wherein when a mobile terminal as the second electronic apparatus is to receive the multimedia resource push information, the step of transmitting the multimedia resource push information by the cloud server to the mobile terminal as the second electronic apparatus comprises: the cloud server firstly obtains a status of a packet switch domain of the mobile terminal to check whether data service of the mobile terminal is enabled, and
when the data service of the mobile terminal is enabled, the cloud server transmits via the packet switch domain the multimedia, resource push information to the mobile terminal;
when the data service of the mobile terminal is not enabled, the cloud server transmits via a circuit switch domain the multimedia resource push information to the mobile terminal.

6. The method of claim 4, wherein when a set top box as the first electronic apparatus is to receive the multimedia resource push information, and the process of generating the selection result in the step of transmitting the multimedia resource push information by the cloud server to the set top box as the first electronic apparatus comprises;
when memory storage space of a mobile terminal as the second electronic apparatus is relatively small compared with the set top box as the first electronic apparatus, the user controls the set top box to select the set top box as the first electronic apparatus to download the multimedia resource corresponding to the multimedia resource push information;
when the memory storage space of the set top box as the first electronic apparatus is relatively small compared with the mobile terminal as the second electronic apparatus, the user controls the set top box to select the mobile terminal as the second electronic apparatus to download the multimedia resource corresponding to the multimedia resource push information.

7. The method of claim 1, wherein when a set top box as the first electronic apparatus is to receive the multimedia resource push information, and the process of generating the selection result in the step of transmitting the multimedia resource push information by the cloud server to the set top box as the first electronic apparatus comprises:
when a mobile terminal as the second electronic apparatus is in 2G network, the user controls the set top box to select the set top box as the first electronic apparatus to download the multimedia resource corresponding to the multimedia resource push information;
when the mobile terminal as the second electronic apparatus is in 3G, 4G or WIFI network, the user controls the set top box to select the mobile terminal as the second electronic apparatus to download the multimedia resource corresponding to the multimedia resource push information.

8. The method of claim 7, wherein the data interaction between the set top box and the cloud server is implemented via WIFI or a wired network, and the data interaction between the mobile terminal and the cloud server is implemented via a cellular network or WIFI.

9. The method of claim 1, wherein the first or second electronic apparatus submits a preset connection password corresponding to the multimedia resource to the cloud server, and only when the connection password received by the cloud server is verified to be correct transmits the cloud server the multimedia resource to the corresponding first or second electronic apparatus according to the selection result.

10. The method of claim 1, wherein the corresponding first or second electronic apparatus receiving the multimedia resource shares the multimedia resource to any other electronic apparatuses within the local area network to play the multimedia resource.

11. A cloud server, comprising:
a processor;
a memory coupled to the processor to store instructions, which when executed by the processor, cause the processor to perform operations, the operations including:
receiving multimedia resource demand configuration information transmitted by a first electronic apparatus or a second electronic apparatus, wherein the multimedia resource demand configuration information is generated by the first electronic apparatus or the second electronic apparatus through recording a multimedia resource that a user plays;
performing a matching operation according to the multimedia resource demand configuration information to generate multimedia resource push information;
transmitting the multimedia resource push information to the first electronic apparatus or the second electronic apparatus so that the first electronic apparatus or the second electronic apparatus selects the corresponding one of the first electronic apparatus and the second electronic apparatus to download the multimedia resource corresponding to the multimedia resource push information so as to generate a selection result, wherein the first electronic apparatus and the second electronic apparatus are electronic apparatuses that support multimedia resource sharing within, an LAN; and
transmitting the multimedia, resource corresponding to the multimedia resource push information to the first electronic apparatus or the second electronic apparatus according to the selection result so that the first electronic apparatus or the second electronic apparatus downloads the multimedia resource.

12. The cloud server of claim 11, wherein the operations further include determining whether an updated multimedia resource corresponding to the multimedia resource demand configuration information, exists in a multimedia resource database of the cloud server, and if the updated multimedia resource exists in the multimedia resource database, then generating the multimedia resource push information corresponding to the updated multimedia resource.

13. The cloud server of claim 11, wherein the cloud server is provided with private storage spaces for the multimedia resources of each user.

14. An electronic apparatus, comprising:
a processor; and
a memory coupled to the processor to store instructions, which when executed by the processor, cause the processor to perform operations, the operations including:
generating multimedia resource demand configuration information through recording a multimedia resource that a user plays;
transmitting the multimedia resource demand configuration information to a cloud server so that the cloud server performs a matching operation according to the multimedia resource demand configuration information to generate multimedia resource push information;

receiving the multimedia resource push information transmitted by the cloud server;

after the multimedia resource push information transmitted by the cloud server has been received, selecting the electronic apparatus or another electronic apparatus to download the multimedia resource corresponding to the multimedia resource push information so as to generate a selection result, wherein the electronic apparatus and the another electronic apparatus are electronic apparatuses that support multimedia resource sharing within an LAN; and receiving and downloading the multimedia resource corresponding to the multimedia resource push information transmitted by the cloud server when the selection result indicates that the multimedia resource corresponding to the multimedia resource push information is to be downloaded by the electronic apparatus.

15. The electronic apparatus of claim 14, wherein the operations further include, after the multimedia resource corresponding to the multimedia resource push information transmitted by the cloud server has been received and downloaded, sharing the downloaded multimedia resource with any of other electronic apparatuses that supports multimedia resource sharing within the LAN so that any of the other electronic apparatuses plays the multimedia resource; wherein the electronic apparatus serves as a server for multimedia resource sharing within the LAN.

16. The electronic apparatus of claim 14, wherein:

the electronic apparatus and the another electronic apparatus are configured to support the DLNA protocol within the LAN to achieve multimedia resource sharing.

17. The electronic apparatus of claim 14, wherein the electronic apparatus is a mobile terminal, and the another electronic apparatus is a set top box.

18. The electronic apparatus of claim 17, wherein the operations further include:

when memory storage space of the mobile terminal as the electronic apparatus is relatively small compared with the set top box as the another electronic apparatus, the mobile terminal selects the set top box as the another electronic apparatus to download the multimedia resource corresponding to the multimedia resource push information;

when the memory storage space of the set top box as the another electronic apparatus is relatively small compared with the mobile terminal as the electronic apparatus, the mobile terminal selects the mobile terminal as the electronic apparatus to download the multimedia resource corresponding to the multimedia resource push information.

19. The electronic apparatus of claim 17, wherein the operations further include:

when the mobile terminal as the electronic apparatus is in 2G network, the mobile terminal selects the set top box as the another electronic apparatus to download the multimedia resource corresponding to the multimedia resource push information;

when the mobile terminal as the electronic apparatus is in 3G, 4G or WIFI network, the mobile terminal selects the mobile terminal as the electronic apparatus to download the multimedia resource corresponding to the multimedia resource push information.

20. The electronic apparatus of claim 17, wherein when the mobile terminal as the electronic apparatus is to receive the multimedia resource push information, the operations further include:

when data service of the mobile terminal is enabled, receiving via a packet switch domain the multimedia resource push information from the cloud server;

when the data service of the mobile terminal is not enabled, receiving via a circuit switch domain the multimedia resource push information from the cloud server.

* * * * *